United States Patent [19]
Overbury et al.

[11] 4,063,242
[45] Dec. 13, 1977

[54] DOPPLER NAVIGATION SYSTEM WITH REFERENCE SIGNAL SOURCE DIVERSITY

[75] Inventors: Francis G. Overbury, Cuffley; Paul Barton, Bishop Stortford, both of England

[73] Assignee: International Standard Electric Corporation, New York, N.Y.

[21] Appl. No.: 752,537

[22] Filed: Dec. 20, 1976

Related U.S. Application Data

[63] Continuation of Ser. No. 574,853, May 6, 1975, abandoned.

[30] Foreign Application Priority Data

May 30, 1974 United Kingdom .............. 23920/74

[51] Int. Cl.² .............................................. H04B 7/00
[52] U.S. Cl. ......................... 343/100 SA; 343/106 D; 343/854; 343/108 M
[58] Field of Search ....... 343/100 SA, 106 D, 108 M, 343/854

[56] References Cited

U.S. PATENT DOCUMENTS 3,728,729  4/1973  Overbury .............................. 343/108

Primary Examiner—Maynard R. Wilbur
Assistant Examiner—T. M. Blum
Attorney, Agent, or Firm—W. T. O'Neil

[57] ABSTRACT

A Doppler Radio Navigation beacon with multi-element reference and main commutated arrays. The reference signal is programmed among the reference array elements irregularly to provide spatial diversity to the reference signal to eliminate or substantially reduce reference masking effects in certain multi-path situations (as observed at a remote receiving station such as on an aircraft on landing approach deriving angle information from said beacon). A similar irregular element excitation program is imposed on the normal array preserving coherence in the relative radiator movement (during commutation) between reference and main arrays.

2 Claims, 1 Drawing Figure

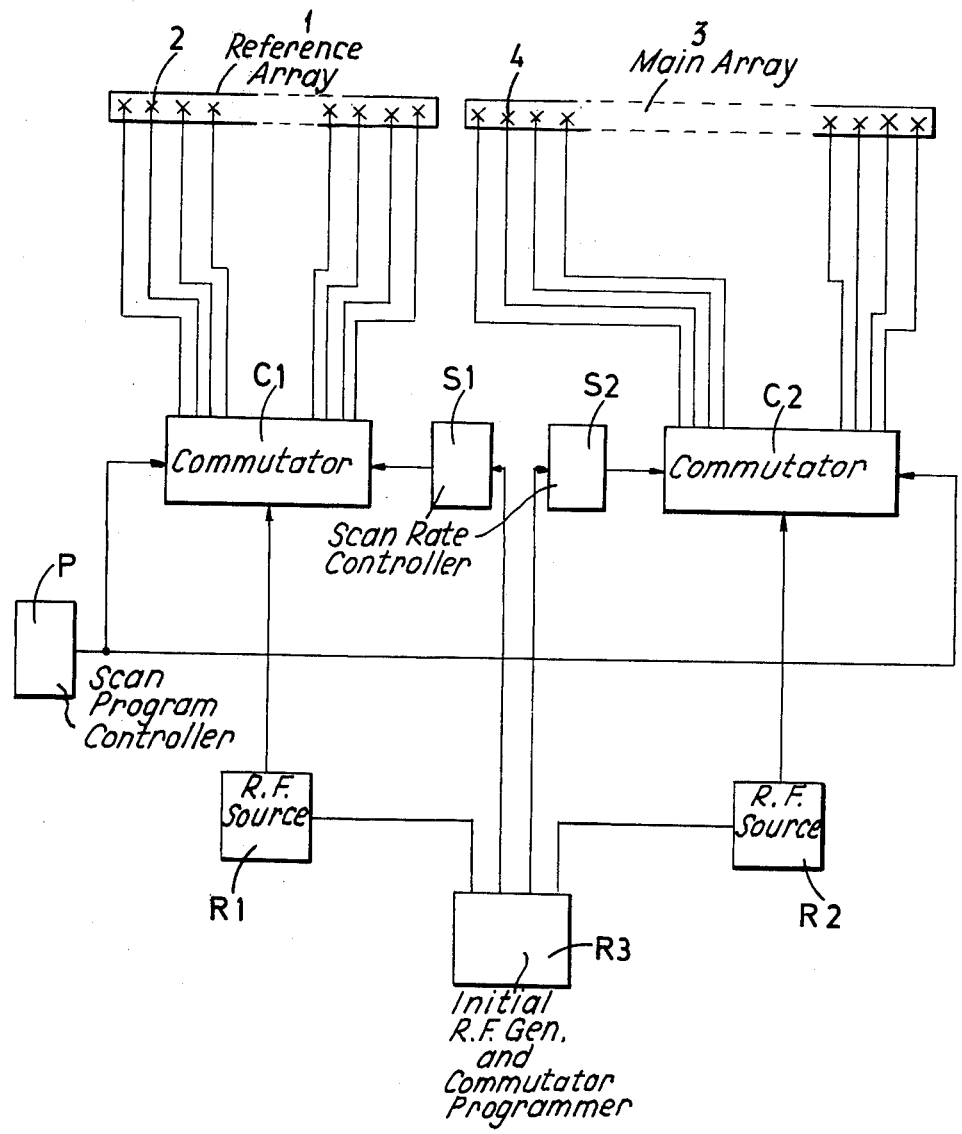

DOPPLER NAVIGATION SYSTEM WITH REFERENCE SIGNAL SOURCE DIVERSITY

This is a continuation of application Ser. No. 574,853, filed May 6, 1975, now abandoned.

BACKGROUND OF THE INVENTION

1. Field of the Invention

This invention relates to radio navigation beacons, particularly those employed in the so-called Doppler radio navigation systems.

2. Description of the Prior Art

In British patent specification No. 1,234,541 (to mention one typical prior art description of a beacon for Doppler navigation) there is described a type of linear array beacon in which a source of radio frequency is commutated to separate radiator elements in order to simulate bidirectional constant velocity motion of the source. Navigational information is derived from these beacons, e.g., elevation angle from a vertical array and azimuth angle from a horizontal array, as the Doppler shift of frequency radiated from the array (as observed at a remote receiving station, i.e., an approaching aircraft) this receiver station subtends to the line of movement of the source.

The radio frequency of the transmitter is typically at least 1 GHz, and since the maximum Doppler frequency shift is of the order of KHz, it is necessary, in practice, to use a reference antenna, at the beacon, which radiates a second radio frequency slightly offset from the commutated frequency, e.g., by 20 KHz and constituted by an upper or lower sideband of the commutated frequency. As described in the above-referenced British patent specification No. 1,234,541, the offset frequency alternates between upper and lower sideband according to direction of scan in the "to-and-fro" scanning which makes up the bidirectional movement (commutation direction) of the source.

The Doppler shift to the frequency of the moving component is then detected as a charge on the beat frequency between the moving component (or main bearing signal) and the reference signal. Thus, the indicated change of beat frequency, which bears the navigational information, is determined by the difference between the two paths.

With the fixed reference antenna of the beacon described in British patent specification No. 1,234,541, this change of path difference arises solely from the movement simulated by the commutated array.

The desired signal components are those transmitted by direct propagation from beacon to receiver, but there are inevitable also generated unwanted, so-called multipath components, by reflection in any practical situation.

Particularly with a horizontal, azimuth guidance array and at very low altitudes, a multipath situation may occur, by signal reflection from a buidling such as a hangar, which affects the integrity of the reference component. If a multipath signal occurs at substantially the same strength and at a 180° phase with respect to the reference component from a single reference antenna, the reference component will, at least temporarily, disappear. This would result in loss of azimuth guidance at a crucial point in the landing approach of an aircraft relying on the ground beacon transmissions.

SUMMARY OF THE INVENTION

It may be said to have been the general object of the invention to maximize the integrity of the reference component of a Doppler navigational system, and particularly, in respect to the aforementioned reference loss phenomenon.

According to the invention, there is provided a radio navigation beacon including first and second aligned linear arrays of spaced antenna elements (radiators), means for commutating energy at a first radio frequency to each of the first array radiators, means for commutating energy at a second radio frequency different from said radio frequency to each of the second array radiators, and means for controlling the respective commutation means such that the first array radiators are energized in an irregular scan and the same irregularity is superimposed on a linear scan of the second array elements to preserve coherence in the relative movement of the second array radiation with respect to the first array radiation.

BRIEF DESCRIPTION OF THE DRAWING

A single drawing FIGURE depicting a schematic block diagram of a Doppler beacon including the invention.

DESCRIPTION OF THE PREFERRED EMBODIMENT

Referring to the drawing, it will be seen that the beacon comprises a first (reference) array 1 of (typically) 10 antenna elements, typically shown at 2, spaced a half wavelength. Aligned therewith is a second (main) array 3 comprised of 240 radiators 4 (for example), spaced a half wavelength.

Each of the elements 2 of the reference array is coupled to a discrete separate output of a commutator C1, and each of the elements 4 of the main array is coupled to a discrete separate output of a commutator C2.

The commutation rate of the respective commutators, C1, C2, is determined by scan rate controllers S1 and S2; the commutator C1 feeding a first radio frequency ($f$) from a first source R1 to the elements of the first array 1, and the commutator C2, feeding a second radio frequency ($f_1$), slightly offset from $f$, from a second source.

The drawing also includes an initial radio frequency generator and commutator programmer, R3, from which are derived both of the array excitation frequencies and also the appropriate scanning frequencies to the scan rate controllers for the respective commutators.

As discussed in the opening paragraphs of this specification, the use of a single reference antenna with omnidirectional radiation of the reference transmission, could be subject to severe contamination from multipath sources.

In accordance with the combination of the present invention, this is overcome by providing spatial diversity to the reference component. To effect this diversity, the reference signal is moved over the baseline of the reference array in an irregular manner. Accordingly, a scan program controller P is provided which determines output selection of the commutator C1 in accordance with a predetermined irregular coding, so that the reference frequency $f$ is fed to the antenna elements such as 2 of the reference array in accordance with this irregular pattern of scan.

The same irregular coding is superimposed on the normal scan program of the main array 3, as determined by output selection of the commutator C2 feeding the main signal frequency $f_1$, thus preserving coherence in the relative movement of the main array radiation with respect to the reference radiation, thus causing no disturbance to the beat spectrum observed at the remote receiving station, which contains the required bearing information (azimuth for a horizontal alignment).

A typical sequence is set out herebelow, wherein the excited reference array position at each step is identified by an appropriate number and the excited main array position by an appropriate letter.

| Step Number | Reference Array Position | Main Array Position | Separation |
| --- | --- | --- | --- |
| 1 | 5 | B | d |
| 2 | 7 | A | d + 1 |
| 3 | 6 | C | d + 2 |
| 4 | 1 | J | d + 3 |
| 5 | 3 | H | d + 4 |
| 6 | 8 | D | d + 5 |
| 7 | 7 | F | d + 6 |
| 8 | 4 | K | d + 7 |
| 9 | 10 | E | d + 8 |
| 10 | 9 | G | d + 9 |

This sequence maintains a linear separation of radiating sources while "shuffling" each source as it scans. Thus the effect on the aforementioned beat signal is the same as provided by linear uniform main array commutation and a fixed reference radiator.

After the first 10 steps, the array radiation continues to be commutated along the main array, either repeating the reference array sequence or possibly with a new random sequence.

The total sequence of reference movement is completed within the duration of each single scan, i.e., each half of the complete bidirectional scan of the main array, and at the end is returned to its starting point. This insures that the maximum diversity, consistent with the reference baseline, is achieved within each single scan, and that no undesirable cross-products are generated near the main bearing spectrum.

What is claimed is:

1. A Doppler radio navigation beacon system with reference antenna spatial diversity comprising:
    reference and main colinear arrays, each including first and second pluralities of uniformly spaced, separately excitable antenna elements, respectively, said second plurality of elements being an integral multiple K of the number of said first plurality;
    first and second RF sources for generating reference and main array RF signals, respectively, with a predetermined frequency offset therebetween;
    third means for cyclically commutating the signal of said second RF source among the elements of said main array in a pattern randomized as to excited element position within said main array, thereby generating a first irregular sequence;
    and fourth means for cyclically commutating the signal of said first RF source among the elements of said reference array in a pattern randomized as to excited element position within said reference array, thereby to generate a second irregular sequence, the excitation time of each element of said reference array being substantially equal to the excitation time of a corresponding main array element excited contemporaneously, said third and fourth means further being programmed such that the spacing measured along the line of said colinear arrays between main and reference elements excited contemporaneously changes according to a linear progression as the main array element excited in said first irregular sequence is changed.

2. A system according to claim 1 in which said fourth means includes means for effecting a repeat cycle of said second irregular sequence each time N steps of said first irregular sequence are completed, N being the number of elements in said reference array, K of said second sequence cycles being included during the time of each of said first sequences.

* * * * *